United States Patent
Nakamura et al.

(10) Patent No.: US 6,616,401 B2
(45) Date of Patent: Sep. 9, 2003

(54) PART-SUPPLYING TRAY FEEDER AND METHOD OF PICKING-UP PARTS IN THE TRAY

(75) Inventors: Yuji Nakamura, Fukuoka (JP); Taisuke Mori, Fukuoka (JP); Takashi Tamura, Fukuoka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/832,835

(22) Filed: Apr. 12, 2001

(65) Prior Publication Data

US 2002/0003995 A1 Jan. 10, 2002

(30) Foreign Application Priority Data

Apr. 12, 2000 (JP) .................................... 2000-110290
Apr. 12, 2000 (JP) .................................... 2000-110291

(51) Int. Cl.[7] ................................................ B65G 1/06
(52) U.S. Cl. ............. 414/811; 414/222.02; 414/331.11; 414/416.08; 414/806; 198/341.05
(58) Field of Search ........................... 414/222.01, 268, 414/270, 273, 280, 286, 331.06, 331.1, 331.11, 416.07, 416.08, 609, 806, 807, 811, 222.02, 610, 796.7; 700/214, 229, 250; 901/6; 198/502.2, 341.02, 341.05

(56) References Cited

U.S. PATENT DOCUMENTS

| | | | | |
|---|---|---|---|---|
| 3,923,145 A | * | 12/1975 | Muller .................... | 198/502.2 |
| 4,921,087 A | * | 5/1990 | Nakamura .................... | 414/273 |
| 4,988,263 A | * | 1/1991 | Odenthal .................... | 414/795.8 |
| 5,104,105 A | * | 4/1992 | Cote et al. .................... | 270/1.1 |
| 5,312,221 A | * | 5/1994 | Furukawa et al. .......... | 414/273 |
| 5,380,138 A | * | 1/1995 | Kasai et al. ................. | 414/277 |
| 5,501,565 A | * | 3/1996 | Fujino et al. ................ | 414/273 |
| 5,556,252 A | * | 9/1996 | Kuster ..................... | 414/796.7 |
| 5,930,144 A | * | 7/1999 | Kondo et al. ................ | 414/273 |
| 6,036,425 A | * | 3/2000 | Seto ......................... | 414/277 |
| 6,524,052 B1 | * | 2/2003 | Yamauchi et al. ........ | 414/331.1 |

FOREIGN PATENT DOCUMENTS

| | | | | |
|---|---|---|---|---|
| JP | 55-68196 | * | 5/1980 | ............ 414/222.02 |
| JP | 5-24612 | * | 2/1993 | ................. 414/273 |
| JP | 6-56225 | * | 3/1994 | ................. 414/273 |

* cited by examiner

*Primary Examiner*—James W. Keenan
(74) *Attorney, Agent, or Firm*—RatnerPrestia

(57) ABSTRACT

In a tray feeder, in which a drawing section draws a palette from a container and supplies the palette to a pick-up point where a pick-up head of a parts-mounting-apparatus picks up parts, the head starts lowering and halts at a stand-by position before the palette held by the drawing section arrives at the pick-up point. When the drawing section arrives at the pick-up point, the head lowers again from the stand-by position. This mechanism reduces a time necessary for picking up a part.

9 Claims, 6 Drawing Sheets

PART-SUPPLYING TRAY FEEDER AND METHOD OF PICKING-UP PARTS IN THE TRAY

FIELD OF THE INVENTION

The present invention relates to a tray feeder supplying electronic parts packed in a tray to a part-mounting-apparatus and a method of picking up parts from the tray.

BACKGROUND OF THE INVENTION

In a part-mounting-apparatus, a method of using tray feeders is known as one of the methods of supplying electronic parts, e.g., semiconductor chips. In this tray feeder, a plurality of parts are packed in a planar condition in these trays, and the trays are accommodated in a container such as a magazine. Respective trays are sequentially taken out according to the order of parts to be supplied, and the parts are supplied to a pick-up point where a pick-up head of the apparatus picks up the parts.

In one of conventional magazines, trays are accommodated in a vertical direction and a tray is drawn horizontally by a drawing section, and the drawing section is elevated or lowered to a pick-up point. When the drawing section have moved and the tray halts at the pick-up point, a pick-up head moves from a stand-by position to pick up a part from the tray. In other words, at every pick-up action, the head lowers from the stand-by position to the pick-up point and picks up the part by bringing a nozzle of the head in contact with an upper surface of the part contained in the tray. As such, a conventional tray feeder requires the head, at every pick-up action, to move from the stand-by position to the pick-up point. This results in increasing a cycle time of part-mounting.

Further, in the conventional tray feeder discussed above, the tray rises to the pick-up point, and subsequently the head starts lowering regardless of types of the parts. Thus a time for lowering the head varies depending on a thickness of a part, i.e., the head must lowered additionally in the case of a thin part. In this case, it takes a longer time, which increases the cycle time of the part-mounting.

SUMMARY OF THE INVENTION

The present invention addresses the problem discussed above, and aims to provide a tray feeder, which can improve productivity by shortening a cycle time of part-mounting, and a method of picking up parts using the tray feeder.

The tray feeder of the present invention supplies parts to a pick-up point where a head of a parts-mounting-apparatus picks up the part, and the tray feeder comprises the following elements:

(a) a drawing section for drawing a palette—holding a tray in which parts are packed—from a container accommodating the palette, and holding the palette;
(b) a lift for elevating or lowering the drawing section;
(c) a controller for controlling the head to start lowering before the palette drawn reaches a pick-up point;

Another tray feeder of the present invention comprises the following elements:

(a) a drawing section for drawing a palette—holding a tray in which parts are packed—from a container accommodating the palette, and holding the palette;
(b) a lift for elevating or lowering the drawing section;
(c) a timing setter for setting a timing—for a pick-up head to start lowering from a stand-by position—in relation to a height of the drawing section and responsive to types of the parts packed in the palette; and
(d) a controller for controlling the head to start lowering from the stand-by position when the drawing section reaches the height set in relation to the timing.

A method of picking up parts from a tray according to the present invention comprises the following steps:

(a) drawing a palette—holding a tray in which parts are packed—from a container by a drawing section which can be elevated or lowered, and then holding the palette;
(b) controlling a pick-up head of a parts-mounting-apparatus to start lowering before the palette drawn by the drawing section reaches a pick-up point; and
(c) picking up a part from the pick-up point by the head after the palette reaches the pick-up point.

Another method of picking up the parts comprises the following steps:

(a) drawing a palette—holding a tray in which parts are packed—from a container by a drawing section which can be elevated or lowered, and then holding the palette;
(b) starting to lower the head when the drawing section reaches the height set in relation to a timing of the head starting to lower and responsive to types of parts packed in the palette, in a course of the drawing section, which draws and holds the palette, rising toward a pick-up point; and
(c) picking up a part from the pick-up point by the head after the palette reaches the pick-up point.

According to the present invention, before the palette held by the drawing section arrives at the pick-up point, the pick-up head starts lowering from the stand-by position, thereby reducing a time for picking a part up. Further, before the drawing section arrives at the height of pick-up point, the head starts lowering from the stand-by position with a timing set responsive to types of the parts. This mechanism also reduces a time for picking a part up, and as a result, the total time for part-mounting can be reduced.

DETAILED DESCRIPTION OF THE EXEMPLARY EMBODIMENTS

Exemplary embodiments of the present invention are demonstrated hereinafter with reference to the accompanying drawings.

First Exemplary Embodiment

Figure 1:
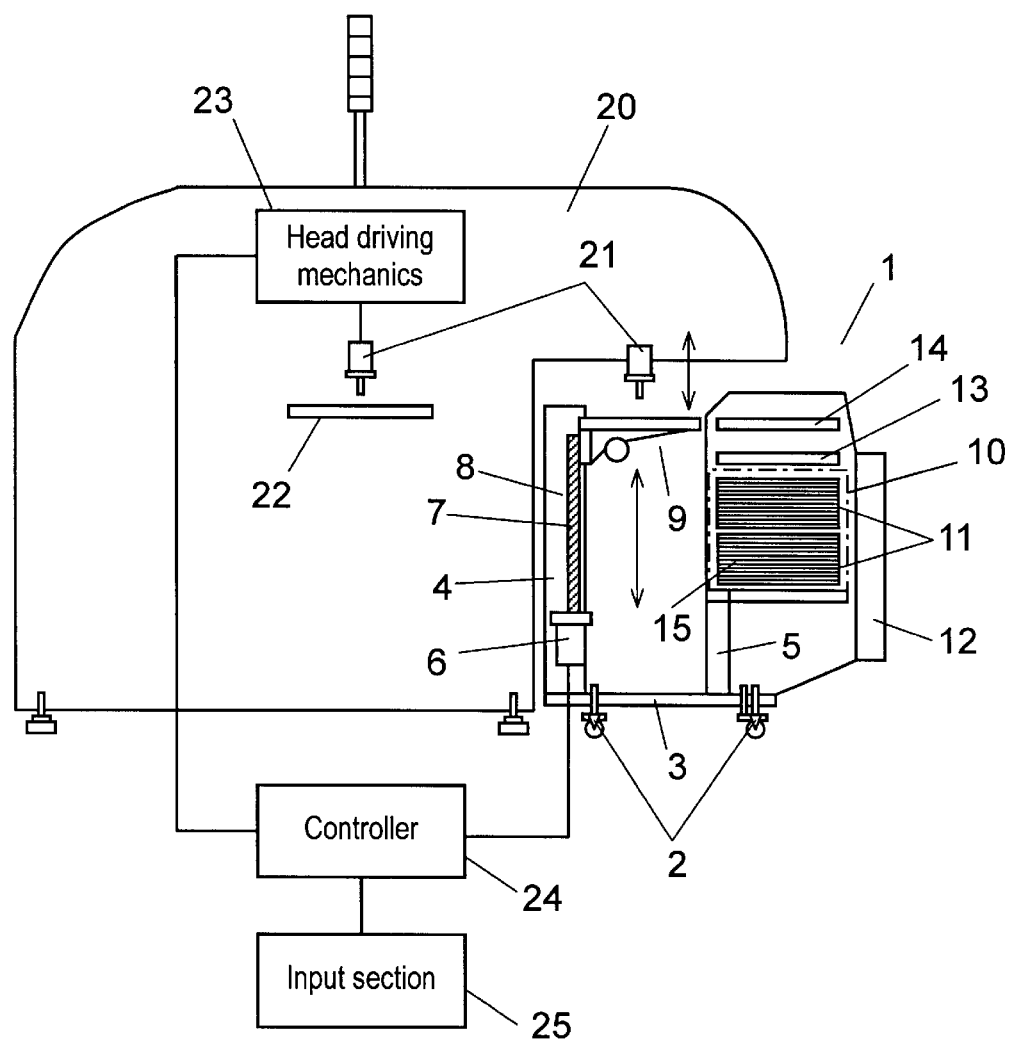
FIG. 1 is a lateral view of a parts-mounting-apparatus to which a parts-supplying tray feeder is linked in accordance with a first exemplary embodiment of the present invention.

FIG. 1 is a lateral view of a parts-mounting-apparatus to which a parts-supplying tray-feeder is linked in accordance with the first exemplary embodiment of the present invention. First, the tray feeder is described with reference to FIG. 1.

In FIG. 1, tray feeder 1 comprises base member 3 supported by casters 2, and frames 4, 5 standing on base member 3. Container 10 for magazines is fixed to frame 5. Two magazines 11 are accommodated in container 10. Numbers of palettes 15 are stacked in each magazine 11. Door 12 is disposed behind container 10 so that magazine 11 can be mounted or detached therethrough.

Lift 8 including motor 6 and feed screw 7 is equipped to frame 4. Lift 8 is driven, so that drawing section 9 rises and falls as shown with arrow marks in FIG. 1. Drawing section 9 draws palette 15 housed in magazine 11 and holds it on the upper face thereof. Drawing section 9 is elevated, so that palette 15 held by drawing section 9 moves to a pick-up point, where a pick-up head of the apparatus comes to pick a part up.

Discharge section 13 is disposed above magazine 11, and discharge section 13 accommodates parts not mounted but to be discharged. Supply section 14 is disposed above discharge section 13, and supply section 14 takes out a palette having a vacant tray from which parts have been picked up or puts a palette again into line.

A tray (not shown) is mounted to palette 15 housed in magazine 11. In this tray, numbers of parts are packed in matrix. Drawing section 9 is equipped with a palette-moving-mechanics (not shown). This mechanics draws palette 15 from magazine 11 and puts it onto drawing section 9, or inserts palette 15 again into magazine 11.

Drawing section 9 rises up to the pick-up point of a part by head 21, in other words, the tray mounted to palette 15 drawn from magazine 11 is supplied to the pick-up point by elevating drawing section 9. Then the part picked up by head 21 is mounted to board 22 positioned at a mounting section.

Motor 6 is equipped with an encoder. The encoder counts the rotation of motor 6, thereby detecting a height position of drawing section 9. The detection result is transferred to controller 24 of parts-mounting-apparatus 20. Controller 24 controls an operation of head-driving-mechanics 23 which drives head 21. Thus, the height position of drawing section 9 can be related to a rise/fall timing of head 21. In other words, when drawing section 9—in a rising process holding palette 15—arrives at a predetermined height, head 21 can start or stop rising/falling.

This mechanism discussed above allows controller 24 to start lowering head 21 before palette 15 on drawing section 9 arrives at the pick-up point. The height position of drawing section 9 can be set through inputting numerical data into controller 24 by input section 25. Therefore, the head's timing of starting to lower from the stand-by position can be set in relation to the height position of drawing section 9. This height position is set responsive to types of parts packed in palette 15, i.e., both of input section 25 and controller 24 function as a timing setter.

The parts-supplying tray-feeder used in the first embodiment proves that when drawing section 9 arrives at the height position determined in relation to the head's timing of starting to lower, controller 24 controls mechanics 23 so that head 21 starts lowering.

An operation of the tray feeder used in the first embodiment is demonstrated hereinafter. In FIG. 1, palette 15 containing the parts is accommodated at a given place in magazine 11. When parts-mounting-apparatus 20 starts mounting, drawing section 9 moves to a height of palette 15 containing the parts to be mounted. Then this palette 15 is drawn onto drawing section 9 and held.

Parts-supplying process from this point onward is described with reference to FIG. 2A–FIG. 6. FIGS. 2A, 2B, 3A and 3B describe a method of picking up the parts from the tray shown in FIG. 1.

Figure 2A:
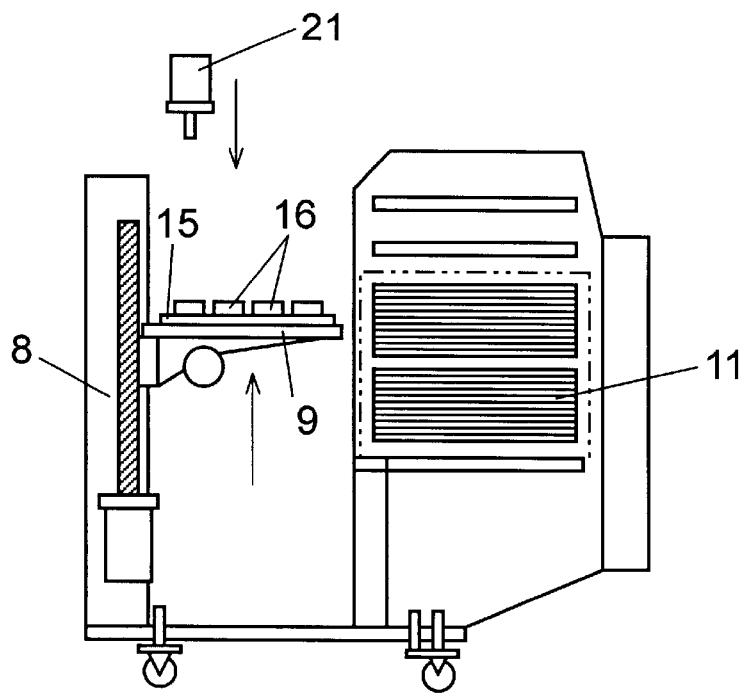
FIGS. 2A, 2B, 3A and 3B illustrate steps of picking a part up from the tray shown in FIG. 1.

First, in FIG. 2A, part 16 is placed in a tray (not shown) on palette 15 drawn onto drawing section 9 from magazine 11. Part 16 is enlarged in FIG. 2A for easy understanding.

Next, drawing section 9 is elevated by lift 8 along an arrow mark. At this time, pick-up head 21 of the apparatus halts at a stand-by position above drawing section 9.

Figure 2B:
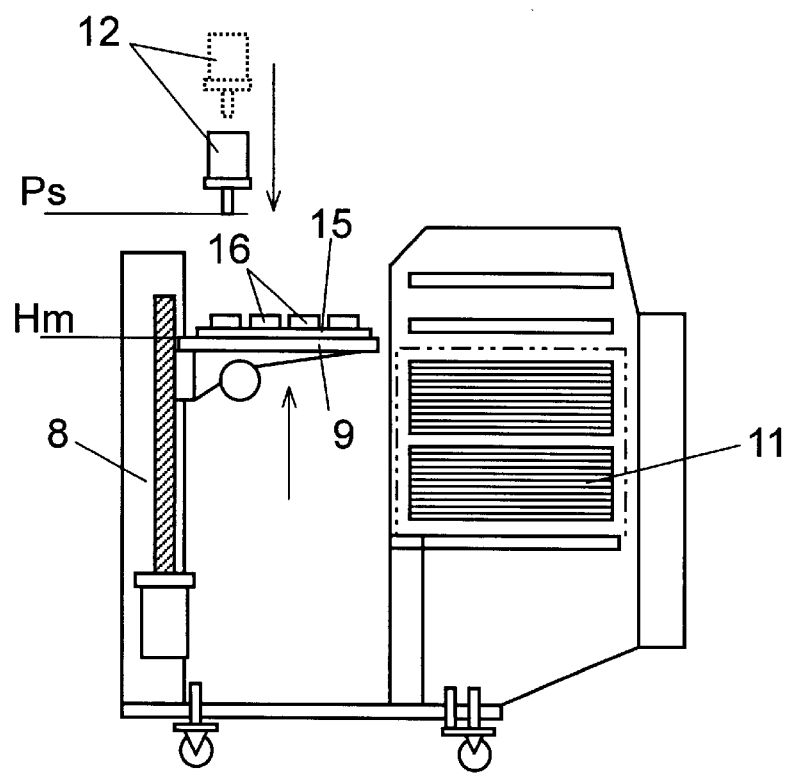
Figure 3A:
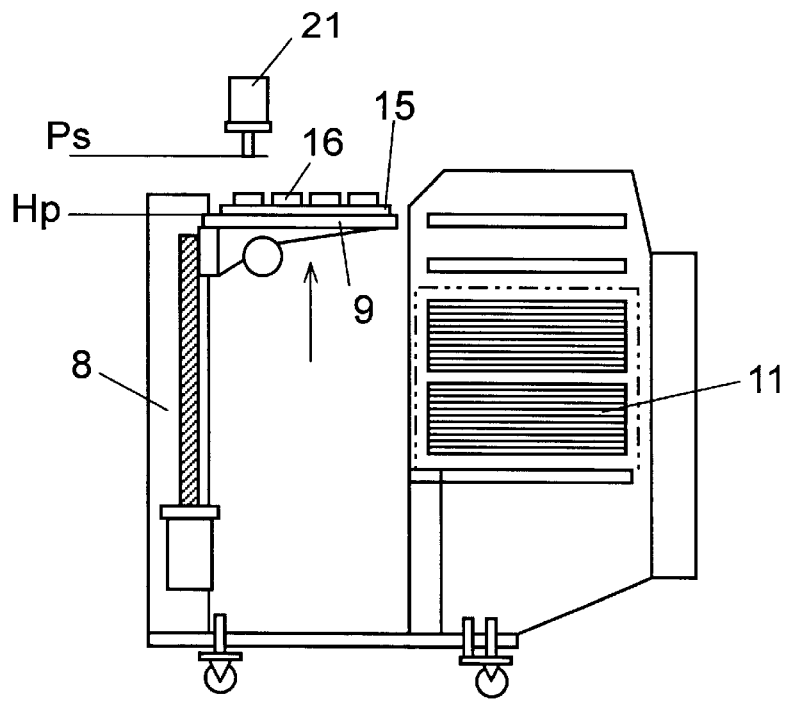
Figure 3B:
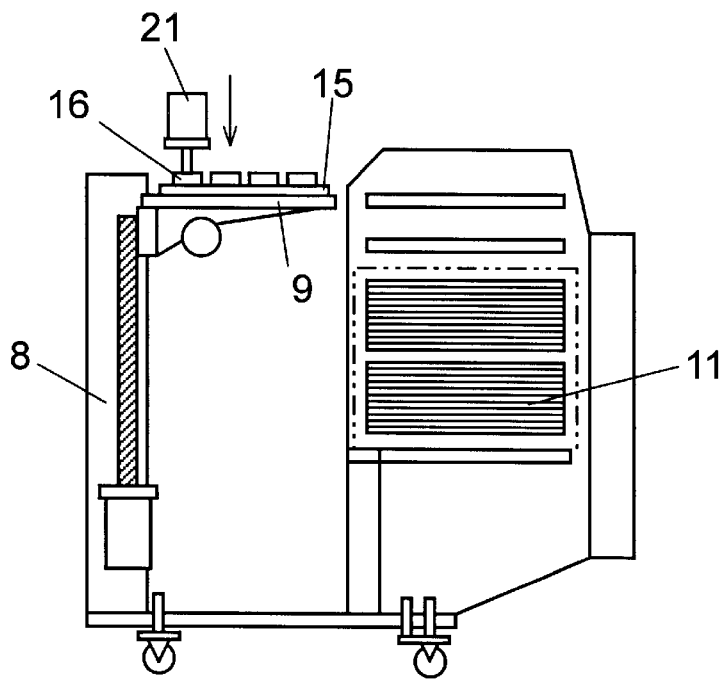

Then as shown in FIG. 2B, when drawing section 9 arrives at a given height "Hm", head 21 starts lowering and halts at stand-by position "Ps" set above the pick-up point. Drawing section 9, on the other hand, continues rising, and stops rising. As shown in FIG. 3A, when palette 15 arrives at pick-up point "Hp" where the part is to be picked up. At this moment, head 21 starts lowering from stand-by position "Ps", and as shown in FIG. 3B, picks up part 16 from palette 15. Then head 21 moves above board 22 to mount part 16 to board 22.

During this pick-up operation, head 21 starts lowering before palette 15 arrives at pick-up point "Hp", and when palette 15 arrives at pick-up point "Hp", head 21 has already arrived at stand-by position "Ps" substantially close to pick-up point "Hp". Therefore, this mechanism allows head 21 to lower to a place only a bit high from stand-by position "Ps" at the pick-up operation. A time necessary for each pick-up operation can be thus reduced, and as a result, the productivity of parts-mounting-apparatus can be improved.

Second Exemplary Embodiment

Figure 4A:
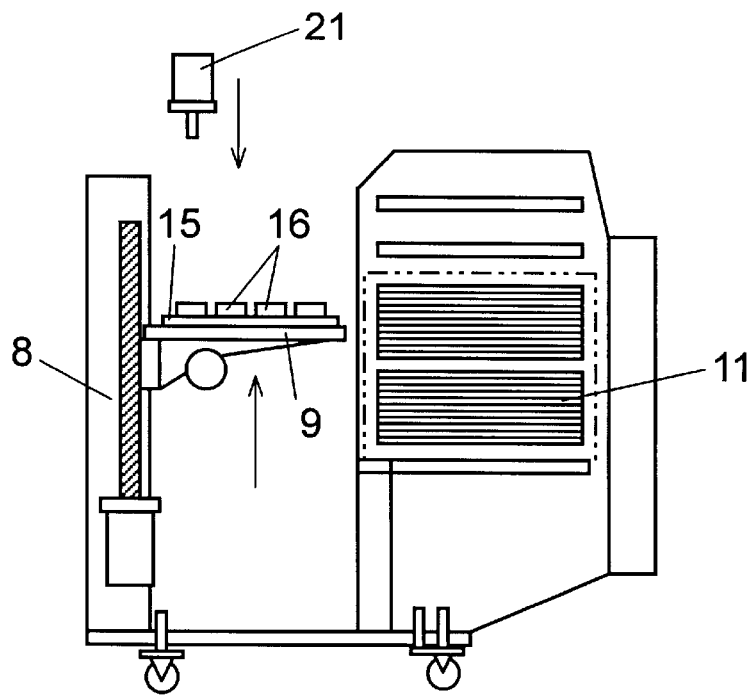
FIGS. 4A, 4B, 5A and 5B illustrate steps of picking a part up in accordance with a second exemplary embodiment of the present invention.

FIGS. 4A, 4B, 5A and 5B illustrate steps of picking a part up in accordance with the second exemplary embodiment of the present invention. In FIG. 4A, part 16 is placed in a tray (not shown) on palette 15 drawn onto drawing section 9 from magazine 11. Part 16 is enlarged in FIG. 4A for easy understanding.

Next, drawing section 9 is elevated by lift 8 along an arrow mark. At this time, pick-up head 21 of the apparatus halts at a stand-by position above drawing section 9.

Figure 4B:
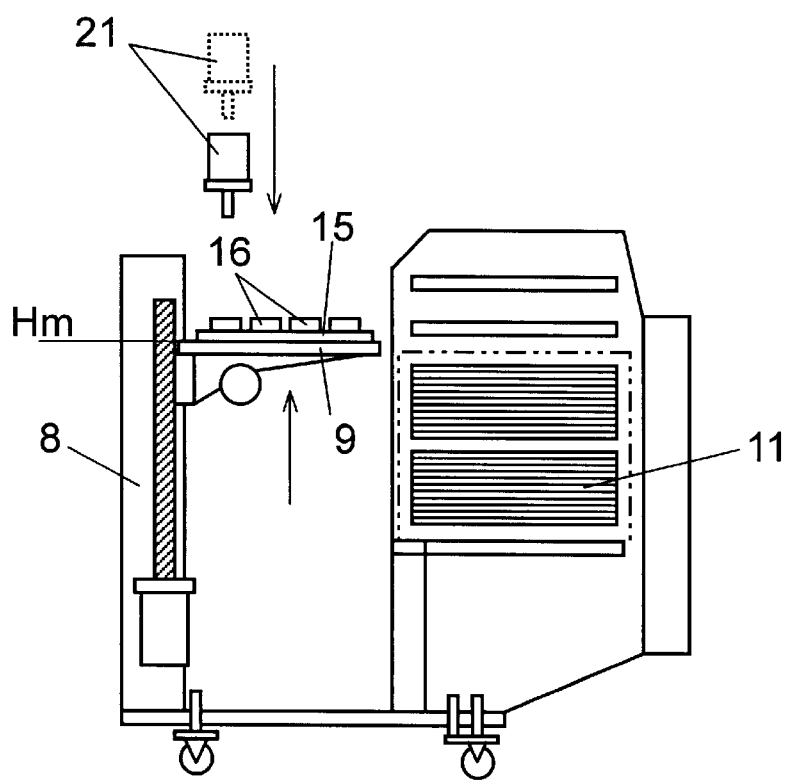

Then as shown in FIG. 4B, when drawing section 9 arrives at a given height "Hm", head 21 starts lowering. This height "Hm" is used for detecting a timing and determined responsive to types of parts 16 and in relation to head's timing of starting to lower.

Figure 5A:
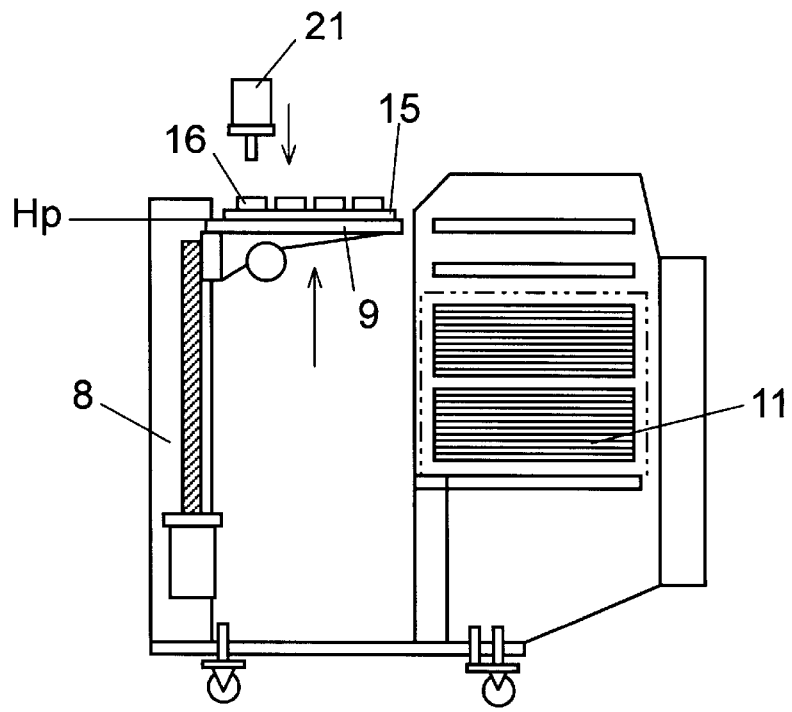

The height position for detecting the timing is described hereinafter. As shown in FIG. 4B, when drawing section 9 arrives at height "Hm", head 21 starts lowering. From this moment, drawing section 9 continues rising up to pick-up point "Hp" as shown in FIG. 5A. It takes time "Td". On the other hand, when a lower end of a nozzle of head 21 arrives at an upper surface of a part on palette 15 at pick-up point "Hp", it takes time "Tn". "Td" and "Tn" are set such that both the times are almost equal to each other. Preferably, both the times are set such that drawing section 9 has risen up to point "Hp" slightly before head 21 lowers to the given position.

In other words, this setting is done based on the following two factors: (1) head's necessary down distance (the distance between the lower end of the nozzle of head 21 at the stand-by position and the upper surface of part 16) and head's lowering speed, (2) drawing section's necessary up distance (the distance between position "Hm" and point "Hp") and drawing section's rising speed.

Figure 6:
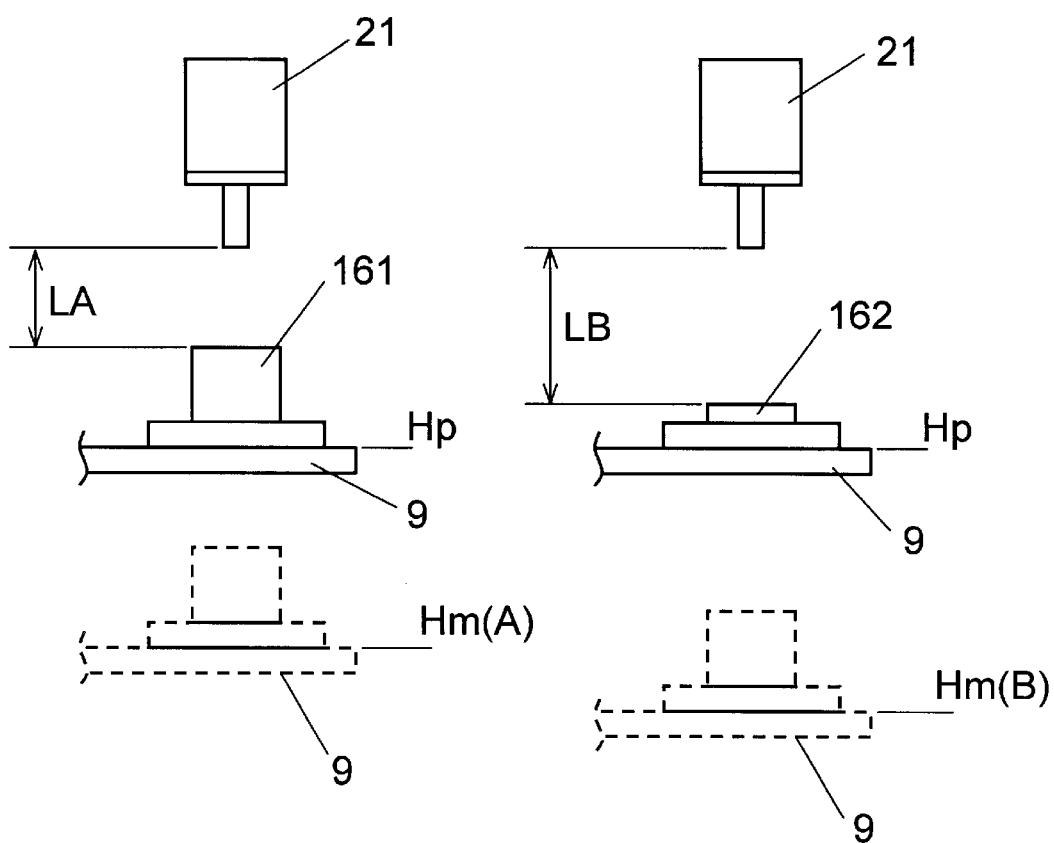
FIG. 6 illustrates how a lowering timing of a pick-up head is set in accordance with a pick-up method employed in the second exemplary embodiment of the present invention.

For instance, when part 161 having a rather large thickness is picked up as shown in FIG. 6, distance "LA" between the upper surface of part 161 in palette 15 positioned at pick-up position "Hp" and the lower end of the nozzle of head 21 is smaller than distance "LB" between the same points on part 162 having a smaller thickness. Therefore, in the case of picking up part 161, head 21 may as well starts lowering at a delayed timing comparing to a case of picking up part 162. In other words, head 21 may start lowering when drawing section 9 arrives at position "Hm(A)" higher than position "Hm(B)" assigned to part 162.

Drawing section 9 continues rising after it arrives at a given height "Hm", shown in FIG. 4B, set responsive to types of parts, and when palette 15 arrives at pick-up point "Hp" as shown in FIG. 5, drawing section 9 stops rising.

Figure 5B:
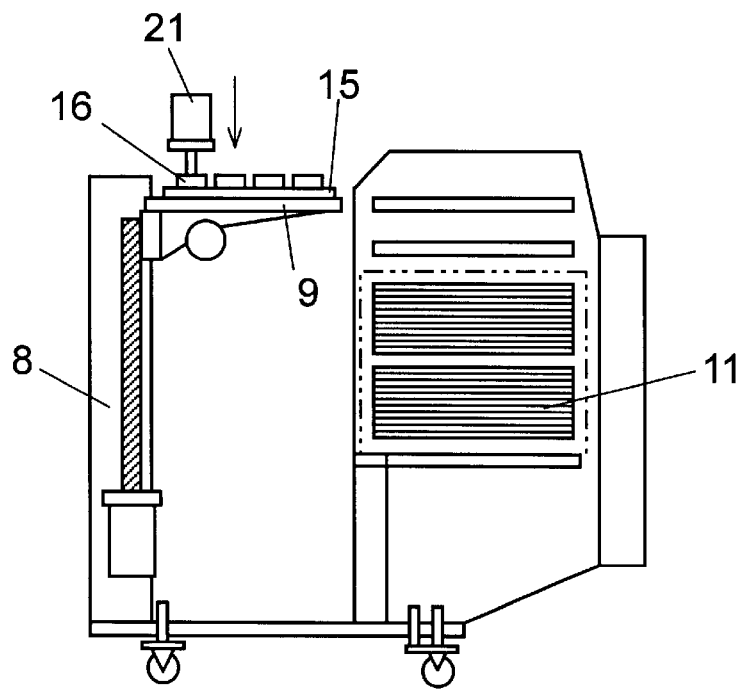

During this period, head 21 continues lowering, and completes lowering just after drawing section 9 has stopped rising, and picks up part 16 on palette 15 at halt, as shown in FIG. 5B. Then head 21 moves above board 22 to mount part 16 onto board 22.

In this pick-up operation, head 21 starts lowering from the stand-by position before palette 15 arrives at pick-up point "Hp". When palette 15 arrives at point "Hp", head 21 has lowered down to the position substantially close to pick-up point "Hp", i.e., the lower end of the nozzle of head 21 stays substantially close to the upper surface of part 16 to be picked up.

Therefore, at a pick-up action, there is little time lag between rising action of drawing section 9 and lowering action of head 21, and yet, height position "Hm" for detecting a timing can be set responsive to types of the parts as mentioned previously. Therefore, when parts of different thickness are to be picked up, the time lag can be always avoided. Thus a cycle time for each pick-up action responsive to various types of parts can be reduced, and as a result, the productivity of the parts-mounting-apparatus can be improved.

As discussed above, according to the present invention, the pick-up head starts lowering from the stand-by position before the palette held by the drawing section arrives at the pick-up point. Thus a cycle time for each pick-up action can be shortened, and as a result, the productivity of the parts-mounting-apparatus employing this tray feeder can be improved.

Before the drawing section arrives at a height position corresponding to the pick-up point of the palette, the pick-up head starts lowering from the stand-by position at a timing set responsive to types of the parts. Thus a time to be wasted can be avoided, and a necessary time for the pick-up action can be reduced.

What is claimed is:

1. A tray feeder for supplying parts to a pick-up point where a pick-up head of a parts-mounting apparatus picks up the parts, said tray feeder comprising:
   a drawing section for drawing a palette from a container and holding the palette, the palette holding a tray which contains the parts;
   a lift for elevating and lowering said drawing section; and
   a controller for controlling the pick-up head, said controller starting to vertically move said pick-up head upon said drawing section reaching a predetermined position within a vertical range of motion of said drawing section, said predetermined position being reached before said drawing section reaches said pick-up point, said predetermined position being selected based on a time required to start lowering the pick-up head.

2. The tray feeder as defined in claim 1 further comprising:
   a detector for detecting a height position of said drawing section.

3. The tray feeder as defined in claim 2, wherein said controller controls the head to start rising or lowering and stop rising or lowering based on a detection result of the height position of said drawing section by said detector.

4. A tray feeder for supplying parts to a pick-up point where a pick-up head of a parts-mounting apparatus picks up the parts, said tray feeder comprising:
   a drawing section for drawing a palette from a container and holding the palette, the palette holding a tray which contains the parts;
   a lift for elevating and lowering said drawing section;
   a timing setter for setting a timing for the head to start lowering from a stand-by position responsive to types of the parts contained in the palette and in relation to a height position of said drawing section; and
   a controller for controlling the pick-up head, said controller starting to vertically move said pick-up head upon said drawing section reaching a predetermined position within a vertical range of motion of said drawing section, said predetermined position being reached before said drawing section reaches said pick-up point, said predetermined position being selected based on a time required to start lowering the pick-up head, the controller determining that said drawing section has reached the predetermined position based on the timing.

5. A method of picking up parts from a parts-supplying tray, said method comprising the steps of:
   drawing a palette from a container and holding the palette by a drawing section allowed to rise and fall, the palette holding a tray containing the parts;
   controlling a pick-up head of a parts-mounting-apparatus to start moving vertically upon the drawing section reaching a predetermined position within a vertical range of motion of the drawing section, the predetermined position being reached before the drawing section reaches a pick-up point, said predetermined position being selected based on a time required to start lowering the pick-up head; and
   picking up the parts by the head from the pick-up point after the palette arrives at the pick-up point.

6. The method of picking up parts as defined in claim 5, wherein when the drawing section arrives at a predetermined height, the head starts lowering and halts at a stand-by position set above the pick-up point.

7. The method of picking up parts as defined in claim 6, wherein the drawing section continues rising and arrives at the pick-up point while the head halts at the stand-by position, then the head starts lowering again from the stand-by position.

8. A method of picking up parts from a parts-supplying tray, said method comprising the steps of:
   drawing a palette from a container and holding the palette by a drawing section allowed to rise and fall within a vertical range of motion of the drawing section, the palette holding a tray containing the parts;
   starting to lower a pick-up head of a parts-mounting-apparatus, when the drawing section-in the course of rising toward the pick-up point-which has drawn and held the palette, arrives at a predetermined position within the vertical range of motion, the predetermined position being reached before the drawing section reaches the pick-up point and the predetermined position being selected based on a time required to start lowering the pick-up head and on the types of the parts contained in the palette; and
   picking up the parts by the head from the pick-up point after the palette arrives at the pick-up point.

9. The method of picking up parts as defined in claim 8, wherein the step of starting to lower the head is set so that a time, necessary for the drawing section to travel from the predetermined position to the pick-up point, becomes almost equal to a time, necessary for the head to lower down to the pick-up point from starting to lower.

* * * * *